(12) United States Patent
Bittner

(10) Patent No.: US 12,290,066 B2
(45) Date of Patent: May 6, 2025

(54) SYSTEM AND METHOD FOR PERFORMING SPRAYING OPERATIONS WITH AN AGRICULTURAL APPLICATOR

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 770 days.

(21) Appl. No.: 17/386,810

(22) Filed: Jul. 28, 2021

(65) Prior Publication Data

US 2023/0032199 A1     Feb. 2, 2023

(51) Int. Cl.
*A01M 7/00*     (2006.01)
*A01C 21/00*     (2006.01)
(Continued)

(52) U.S. Cl.
CPC ........... *A01M 7/0089* (2013.01); *A01C 21/00* (2013.01); *A01M 7/0042* (2013.01); *B05B 12/04* (2013.01); *B05B 12/122* (2013.01)

(58) Field of Classification Search
CPC ... A01M 7/0089; A01M 7/0042; A01C 21/00; B05B 12/04; B05B 12/122; B05B 9/007; B05B 1/20; B05B 12/126
See application file for complete search history.

(56) References Cited

U.S. PATENT DOCUMENTS 6,553,299 B1    4/2003    Keller et al.
10,405,535 B2    9/2019    Rees
(Continued)

FOREIGN PATENT DOCUMENTS

CA        2174154 A     10/1997
CN     111792531 A     10/2020
(Continued)

OTHER PUBLICATIONS

Run, Yan. "Research on Adaptive Control Strategy of Intelligent Spray System." Proceedings of the 2018 2nd International Conference on Automation, Control and Robots. 2018. (Year: 2018).*
(Continued)

*Primary Examiner* — Russell Frejd
*Assistant Examiner* — Ana D Thomas
(74) *Attorney, Agent, or Firm* — Dority & Manning, P.A.

(57) ABSTRACT

A system includes a first nozzle assembly positioned along a boom assembly. The first nozzle assembly includes a first valve operably coupled with a first nozzle. A first imaging device is associated with the first nozzle assembly. A second nozzle assembly is positioned along the boom assembly and includes a second valve operably coupled with a second nozzle. A second imaging device is associated with the second nozzle assembly. A computing system is operably coupled with the first nozzle assembly, the first imaging device, the second nozzle assembly, and the second imaging device. The computing system is configured to receive data from the first imaging device, identify a first reference point within the data provided by the first imaging device, receive data from the second imaging device, identify a second reference point within the data provided by the second imaging device, and determine a boom deflection model.

19 Claims, 9 Drawing Sheets

(51) Int. Cl.
 B05B 12/04 (2006.01)
 B05B 12/12 (2006.01)

(56) References Cited

U.S. PATENT DOCUMENTS

| | | |
|---|---|---|
| 2019/0357520 A1 | 11/2019 | Redden et al. |
| 2020/0375172 A1 | 12/2020 | Elgart |
| 2023/0117884 A1* | 4/2023 | Corti ................. G01N 33/0098 382/110 |

FOREIGN PATENT DOCUMENTS

| | | |
|---|---|---|
| EP | 2835050 A1 | 2/2015 |
| WO | WO 2020157702 A1 | 8/2020 |

OTHER PUBLICATIONS

Bjørnsson, Oddur H., et al. "Dynamic analysis of the intelligent sprayer boom." International Conference on Vibration Problems. Lisbon. 2013. (Year: 2013).*

Bjørnsson, Oddur H., et al., "Dynamic Analysis of the Intelligent Sprayer Boom," University of Southern Denmark, Odense, Denmark, 11th International Conference on Vibration Problems, Z. Dimitrovová et al. (eds.), Lisbon, Portugal, Sep. 9-12, 2013 (12 pages) https://iooev.org/proceedings2013/391_paper0.pdf.

* cited by examiner

SYSTEM AND METHOD FOR PERFORMING SPRAYING OPERATIONS WITH AN AGRICULTURAL APPLICATOR

FIELD

The present disclosure generally relates to agricultural applicators for performing spraying operations within a field and, more particularly, to systems and methods for performing spraying operations with an agricultural sprayer, such as spraying operations that allow for selective application of an agricultural product onto plants.

BACKGROUND

Agricultural sprayers apply an agricultural product (e.g., a pesticide, a nutrient, and/or the like) onto crops and/or a ground surface as the sprayer is traveling across a field. To facilitate such travel, sprayers can be configured as self-propelled vehicles or implements towed behind an agricultural tractor or another suitable work vehicle. In some instances, the sprayer includes an outwardly extending boom assembly having a plurality of boom sections supporting a plurality of spaced-apart nozzle assemblies. Each nozzle assembly has a valve configured to control the spraying of the agricultural product through a nozzle onto underlying targets, which may include crops and/or weeds. The boom assembly is disposed in a "cantilevered" arrangement during the spraying operation, wherein the boom sections are extended to cover wide swaths of the field. For transport, the boom assembly is folded to reduce the width of the sprayer.

Some sprayers may control the flow of agricultural product through individual nozzles based on data received from sensors mounted on the boom sections that detect one or more field conditions (e.g., crops, weeds, moisture content, etc.). However, under certain operating conditions, some or all of the nozzle assemblies may move from a default position as the boom is deflected causing misapplications of the agricultural product.

Accordingly, an improved system and method for performing spraying operations with an agricultural sprayer would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for an agricultural vehicle. The system includes a boom assembly. A first nozzle assembly is positioned along the boom assembly. The first nozzle assembly includes a first valve operably coupled with a first nozzle and is configured to control a flow of agricultural product through the first nozzle. A first imaging device is associated with the first nozzle assembly. A computing system is operably coupled with the first nozzle assembly and the first imaging device. The computing system is configured to receive data related to a first imaged portion of an agricultural field from the first imaging device; identify a first target and a position of a first reference point within the first imaged portion of the agricultural field; receive data related to a second imaged portion of the agricultural field from the first imaging device, the first imaged portion and the second imaged portion each including the first reference point; identify a position of the first reference point within the second imaged portion of the agricultural field; determine a speed of movement of the first nozzle based on a distance of movement of the first reference point; determine a boom deflection model, wherein boom deflection model defines a deflection shape of the boom assembly based on the position of the first imaging device along the boom assembly and the speed of movement of the first nozzle; and activate the first valve when the first target is within a first fan of agricultural product exhausted from the first nozzle based on the boom deflection model.

In some aspects, the present subject matter is directed to a method for selectively applying an agricultural product. The method includes receiving, with a computing system, data related to a first imaged portion of an agricultural field from a first imaging device, the first imaging device associated with a first nozzle assembly including a first valve operably coupled with a first nozzle and configured to control a flow of agricultural product through the first nozzle. The method also includes identifying, with the computing system, a first target and a position of a first reference point within the first imaged portion of the agricultural field. The method further includes receiving, with the computing system, data related to a second imaged portion of the agricultural field from the first imaging device, the first imaged portion and the second imaged portion each including the first reference point. In addition, the method includes identifying, with the computing system, a position of the first reference point within the second imaged portion of the agricultural field. The method also includes determining, with the computing system, a speed of movement of the first nozzle based on a distance of movement of the first reference point. Lastly, the method includes determining, with the computing system, a boom deflection model based on the speed of movement of the first nozzle and a position of the first imaging device along a boom assembly.

In some aspects, the present subject matter is directed to a system for an agricultural vehicle. The system includes a first nozzle assembly positioned along a boom assembly. The first nozzle assembly includes a first valve operably coupled with a first nozzle and is configured to control a flow of agricultural product through the first nozzle. A first imaging device is associated with the first nozzle assembly. A second nozzle assembly is positioned along the boom assembly on an opposing side of the first nozzle assembly from a frame of the boom assembly. The second nozzle assembly includes a second valve operably coupled with a second nozzle and is configured to control a flow of agricultural product through the second nozzle. A second imaging device is associated with the second nozzle assembly. A computing system is operably coupled with the first nozzle assembly, the first imaging device, the second nozzle assembly, and the second imaging device. The computing system is configured to receive data from the first imaging device; identify a first reference point within the data provided by the first imaging device; receive data from the second imaging device; identify a second reference point within the data provided by the second imaging device; and determine a boom deflection model based on a movement of the first reference provided by the first imaging device and on a movement of the second reference provided by the second imaging device. The boom deflection model determines a fore-aft deflection of the boom assembly.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
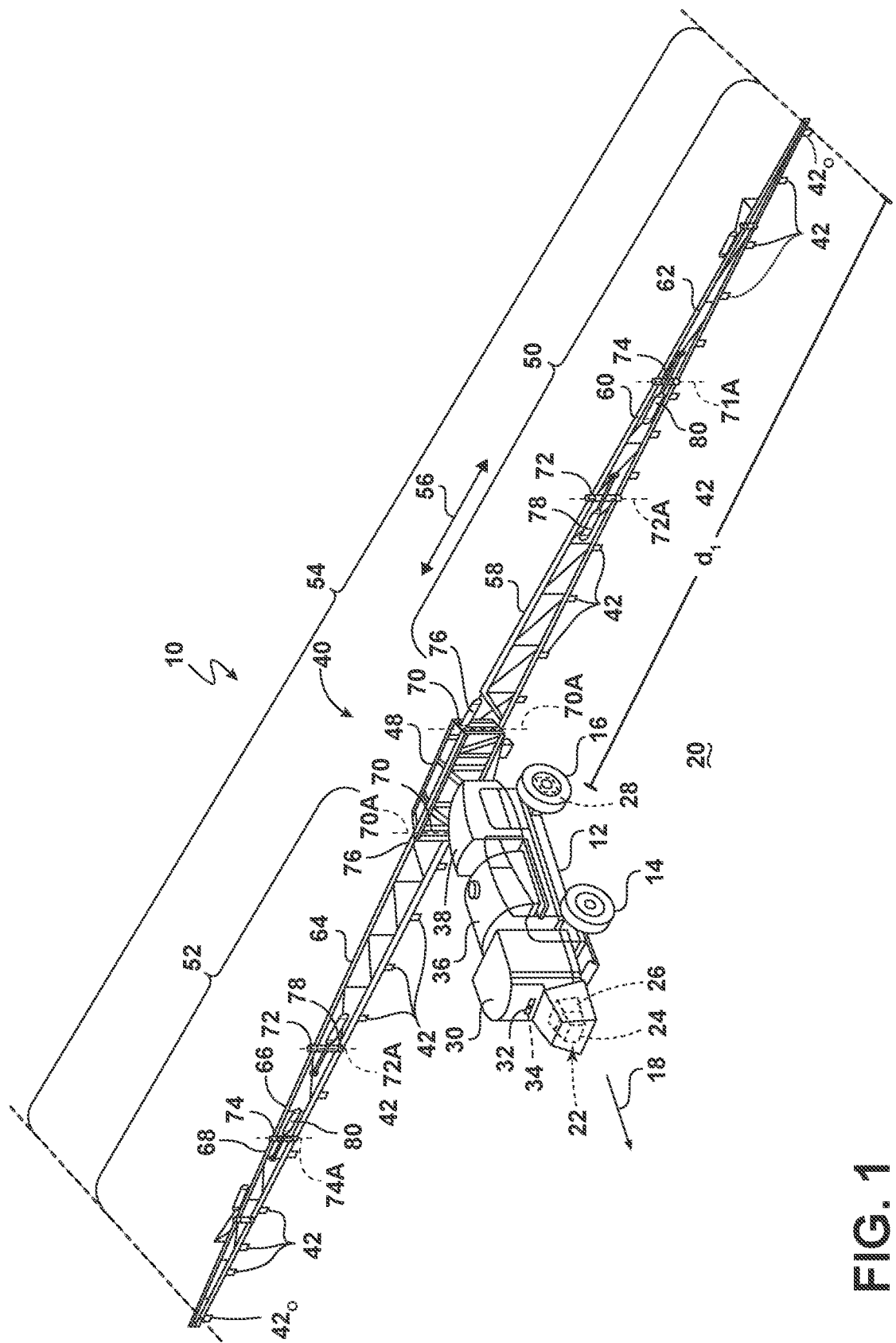
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for an agricultural vehicle. The system includes a boom assembly. A first nozzle assembly may be positioned along the boom assembly. The first nozzle assembly can include a first valve operably coupled with a first nozzle and can be configured to control a flow of agricultural product through the first nozzle. A first imaging device can be associated with the first nozzle assembly.

A second nozzle assembly can be positioned along the boom assembly on an opposing side of the first nozzle assembly from a frame of the boom assembly. The second nozzle assembly can include a second valve operably coupled with a second nozzle and can be configured to control a flow of agricultural product through the second nozzle. A second imaging device can be associated with the second nozzle assembly.

A computing system can be operably coupled with the first nozzle assembly, the first imaging device, the second nozzle assembly, and the second imaging device. The computing system may be configured to receive data from the first imaging device and identify a first reference point within the data provided by the first imaging device. The computing system may also receive data from the second imaging device and identify a second reference point within the data provided by the second imaging device. The computing system may determine a boom deflection model based on a movement of the first reference provided by the first imaging device and on a movement of the second reference provided by the second imaging device. The boom deflection model may predict or determine a magnitude of fore-aft deflection (and/or any other direction) of the boom assembly and/or a speed of movement of the first nozzle and the second nozzle relative to the underlying field and/or relative to the vehicle. As such, the computing system may determine that an outboard nozzle is moving faster than an inboard nozzle. In turn, the computing system may be able to activate the second valve sooner than the first valve even when both targets are positioned generally along a common axis that is parallel to a default axis.

Additionally or alternatively, the computing system may activate the first valve when the first target is projected to pass through a first application region a second time due to oscillation of the boom assembly based on the boom deflection model. Similarly, the computing system may activate the second valve when the second target is projected to pass through a second application region a second time due to oscillation of the boom assembly based on the boom deflection model. In such instances, multiple applications of the agricultural product may be applied to a common target, and/or multiple attempts may be performed on a single target to further ensure that the target was contacted by the agricultural product.

Figure 2:
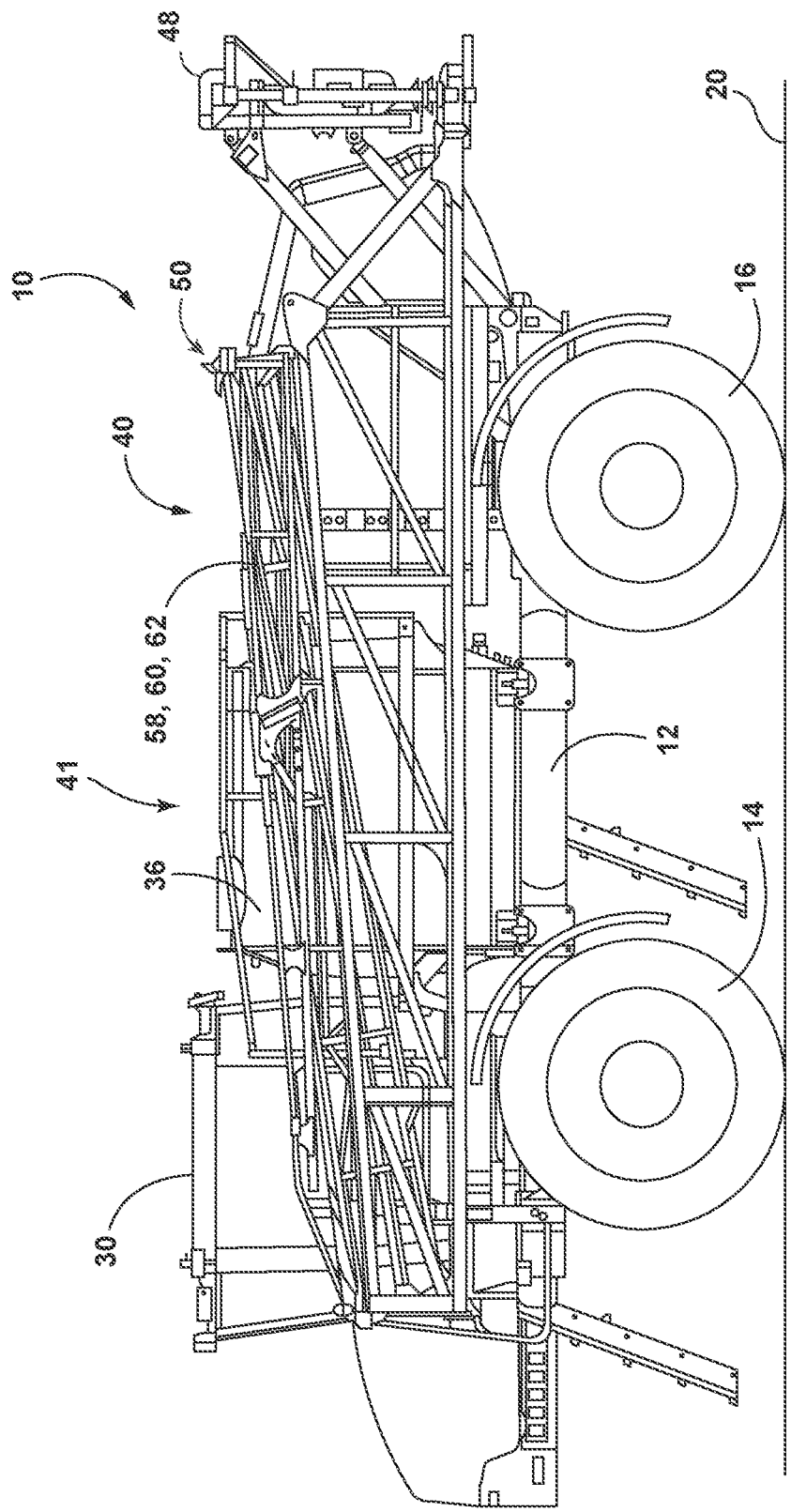
FIG. 2 illustrates a side view of the agricultural sprayer in accordance with aspects of the present subject matter.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a powertrain control system 22, that includes a power plant 24, such as an engine, a motor, or a hybrid engine-motor combination, a transmission system 26 configured to transmit power from the engine to the wheels 14, 16, and/or a brake system 28.

The chassis 12 may also support a cab 30, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface 32, such as a human-machine interface (HMI), for providing messages and/or alerts to the operator and/or for allowing the operator to interface with the vehicle's controller through one or more user-input devices 34 (e.g., levers, pedals, control panels, buttons, and/or the like) within the cab 30 and/or in any other practicable location.

Figure 4:
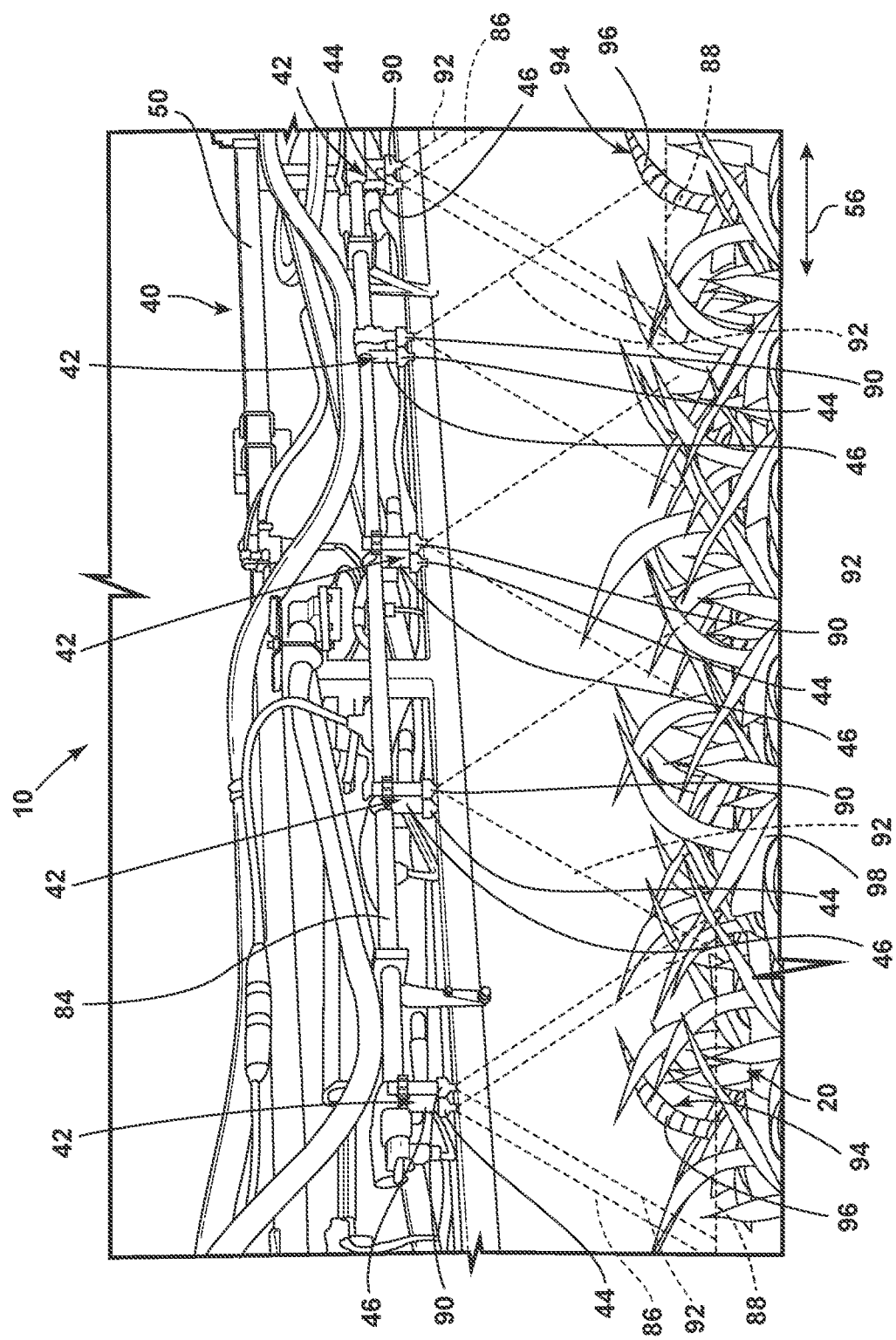
FIG. 4 is a front perspective view of the boom assembly including a plurality of nozzle assemblies positioned there along in accordance with aspects of the present subject matter.

The chassis 12 may also support a product system 41. The product system 41 can include one or more tanks, such as a product tank 36 and/or a rinse tank 38. The product tank 36 is generally configured to store or hold an agricultural product, such as a pesticides (e.g., herbicides, insecticides, rodenticides, etc.) and/or a nutrients. The agricultural product is conveyed from the product tank 36 and/or the rinse tank 38 through a product circuit including numerous plumbing components, such as interconnected pieces of tubing, for release onto the underlying field 20 (e.g., plants and/or soil) through one or more nozzle assemblies 42 mounted on the boom assembly 40 (or the sprayer 10). Each nozzle assembly 42 may include, for example, a spray nozzle 44 (FIG. 4) and an associated valve 46 (FIG. 4) for regulating the flow rate of the agricultural product through the nozzle 44 (and, thus, the application rate of the nozzle assembly 42), thereby allowing the desired spray characteristics of the output or spray fan of the agricultural product expelled from the nozzle 44 to be achieved. In some instances, each valve 46 may be selectively activated to direct an agricultural product towards a defined target 94 (FIG. 4). For instance, each valve 46 may be selectively activated to exhaust a suitable herbicide towards a detected/identified weed and/or a nutrient towards a detected/identified crop.

The chassis 12 may further support a boom assembly 40 that can include a frame 48 that supports first and second boom arms 50, 52, which may be orientated in a cantilevered nature. The first and second boom arms 50, 52 are generally movable between an operative or unfolded position (FIG. 1) and an inoperative or folded position (FIG. 2). When distributing the agricultural product, the first boom arm and/or the second boom arm 50, 52 extends laterally outward from the agricultural sprayer 10 to the operative position in order to cover wide swaths of the underlying ground surface, as illustrated in FIG. 1. When extended, each boom arm 50, 52 defines a first lateral distance $d_1$ defined between the frame 48 and an outer end portion of the boom arms 50, 52. Further, the boom arms 50, 52, when both unfolded, define a field swath 54 between respective outer nozzle assemblies $42_o$ of the first and second boom arms 50, 52 that is generally commensurate with an area of the field 20 to which the agricultural sprayer 10 covers during a pass across a field 20 to perform the agricultural operation. However, it will be appreciated that in some embodiments, a single boom arm 50, 52 may be utilized during the application operation. In such instances, the field swath 54 may be an area defined between a pair of nozzle assemblies 42 that are furthest from one another in a lateral direction 56.

To facilitate transport, each boom arm 50, 52 of the boom assembly 40 may be independently folded forwardly or rearwardly into the inoperative position, thereby reducing the overall width of the sprayer 10, or in some examples, the overall width of a towable implement when the applicator is configured to be towed behind the agricultural sprayer 10.

Each boom arm 50, 52 of the boom assembly 40 may generally include one or more boom sections. For instance, in the illustrated embodiment, the first boom arm 50 includes three boom sections, namely a first inner boom section 58, a first middle boom section 60, and a first outer boom section 62, and the second boom arm 52 includes three boom sections, namely a second inner boom section 64, a second middle boom section 66, and a second outer boom section 68. In such an embodiment, the first and second inner boom sections 58, 64 may be pivotably coupled to the frame 48. Similarly, the first and second middle boom sections 60, 66 may be pivotably coupled to the respective first and second inner boom sections 58, 64, while the first and second outer boom sections 62, 68 may be pivotably coupled to the respective first and second middle boom sections 60, 66. For example, each of the inner boom sections 58, 64 may be pivotably coupled to the frame 48 at pivot joints 70. Similarly, the middle boom sections 60, 66 may be pivotally coupled to the respective inner boom sections 58, 64 at pivot joints 72, while the outer boom sections 62, 68 may be pivotably coupled to the respective middle boom sections 60, 66 at pivot joints 74.

As is generally understood, pivot joints 70, 72, 74 may be configured to allow relative pivotal motion between the adjacent boom sections of each boom arm 50, 52. For example, the pivot joints 70, 72, 74 may allow for articulation of the various boom sections between a fully extended or working position (e.g., as shown in FIG. 1), in which the boom sections are unfolded along the lateral direction 56 of the boom assembly 40 to allow for the performance of an agricultural spraying operation, and a transport position (FIG. 2), in which the boom sections are folded inwardly to reduce the overall width of the boom assembly 40 along the lateral direction 56. It should be appreciated that, although each boom arm 50, 52 is shown in FIG. 1 as including three individual boom sections coupled along opposed sides of the central boom section, each boom arm 50, 52 may generally have any suitable number of boom sections.

Additionally, as shown in FIG. 1, the boom assembly 40 may include inner fold actuators 76 coupled between the inner boom sections 58, 64 and the frame 48 to enable pivoting or folding between the fully-extended working position and the transport position. For example, by retracting/extending the inner fold actuators 76, the inner boom sections 58, 64 may be pivoted or folded relative to the frame 48 about a pivot axis 70A defined by the pivot joints 70. Moreover, the boom assembly 40 may also include middle fold actuators 78 coupled between each inner boom section 58, 64 and its adjacent middle boom section 60, 66 and outer fold actuators 80 coupled between each middle boom section 60, 66 and its adjacent outer boom section 62, 68. As such, by retracting/extending the middle and outer fold actuators 78, 80, each middle and outer boom section 60, 66, 62, 68 may be pivoted or folded relative to its respective inwardly adjacent boom section 58, 64, 60, 66 about a respective pivot axis 72A, 74A. When moving to the transport position, the boom assembly 40 and fold actuators 76, 78, 80 are typically oriented such that the pivot axes 70A, 72A, 74A are generally parallel to the vertical direction and, thus, the various boom sections 58, 64, 60, 66, 62, 68 of the boom assembly 40 are configured to be folded horizontally (e.g., parallel to the lateral direction 56) about the pivot axes 70A, 72A, 74A to keep the folding height of the boom assembly 40 as low as possible for transport. However, the pivot axes 70A, 72A, 74A may be oriented along any other suitable direction.

Figure 3:
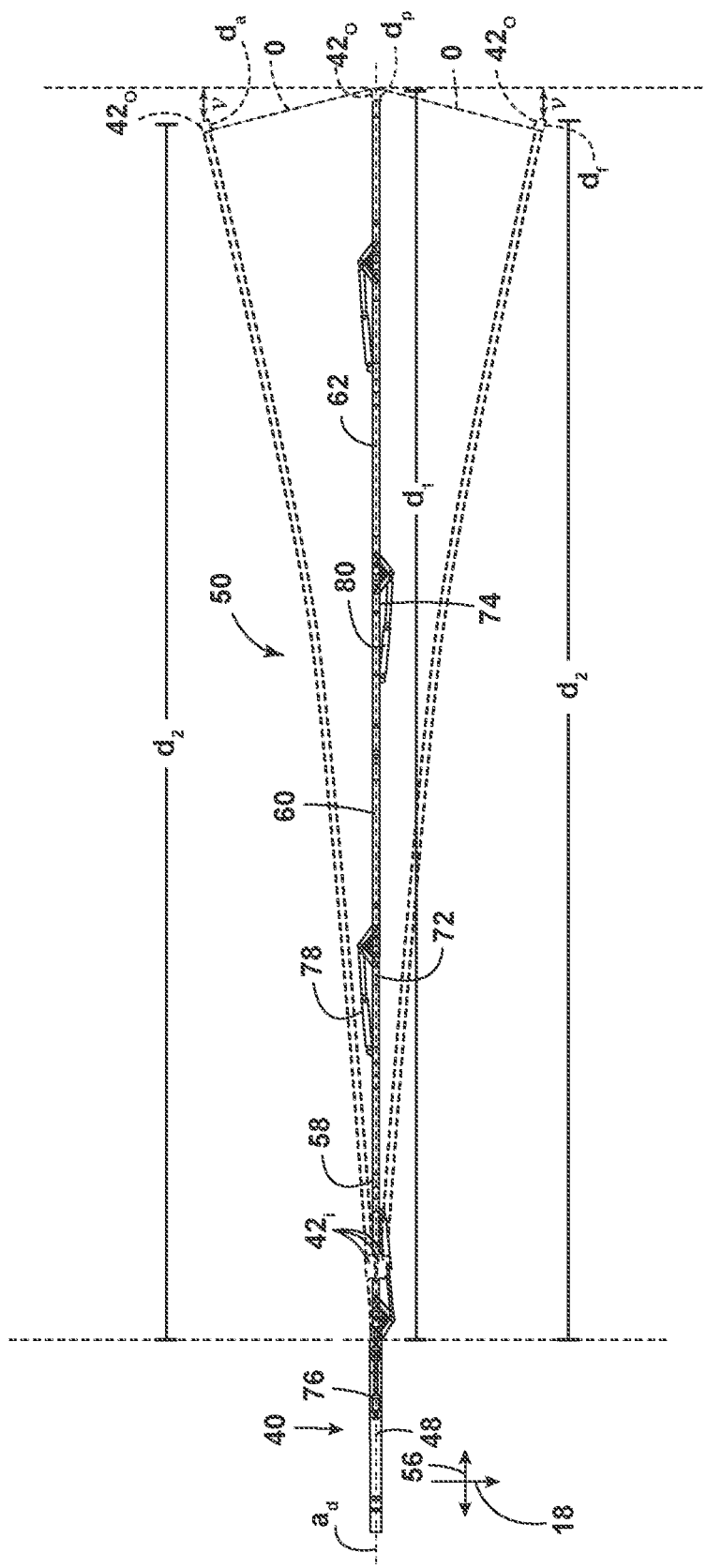
FIG. 3 illustrates a simplified, schematic view of a boom arm of a boom assembly in accordance with aspects of the present subject matter, particularly illustrating the boom arm being deflected in a fore and an aft direction.

Referring to FIG. 3, prior to performing an agricultural operation with the boom assembly 40, either boom arm 50, 52 may be configured to extend a first lateral distance $d_1$ away from the sprayer 10 and/or the frame 48 along a default axis $a_d$. It will be appreciated that although boom arm 50 is generally illustrated in FIG. 3, any boom arm 50, 52 of the boom assembly 40 may operate in a similar manner without departing from the scope of the present disclosure.

In various embodiments, the default axis $a_d$ may generally be perpendicular relative to the vehicle travel direction 18 such that the default axis $a_d$ is generally aligned with the lateral direction 56. The first lateral distance $d_1$ can be defined as a distance between the frame 48 and an outer nozzle assembly $42_o$ and/or an outer end portion of each boom arm 50, 52. Moreover, when the first and second boom arms 50, 52 are extended from opposing sides of the frame 48, the boom arms 50, 52 can define a field swath 54 (a portion of the field swath is illustrated in FIG. 3) between the outer nozzle assemblies $42_o$ of the first and second boom arms 50, 52, or between the outer end portions of the first and second boom arms 50, 52 depending on the agricultural operation and/or a specific spray operation. Further, in some operations, a single boom arm 50, 52 may be used. In such instances, the field swath 54 may be defined between an outer and an inner operating nozzle assembly $42_i$, $42_o$.

During operation, various forces may be placed on the boom assembly 40 causing the boom arms 50, 52 and, consequently, the nozzle assemblies 42 positioned along the boom arms 50, 52, to be deflected or repositioned relative to the frame 48 and/or sprayer 10. For instance, a portion of the boom assembly 40 may be deflected from an assumed or a default position $d_p$ due to high dynamic forces encountered when the sprayer 10 is turned, accelerated, or decelerated. In addition, terrain variations and weather variances may also cause deflection of the boom assembly 40. Further, a portion of the boom assembly 40 may come in contact with an object, thereby leading to deflection of the boom assembly 40.

Once the boom arm 50 is deflected in a fore direction $d_f$ (i.e., a direction of forward movement of the sprayer 10 as indicated by arrow 18 in FIG. 1) and/or in an aft direction $d_a$ (i.e., an opposing direction of the forward movement of the sprayer 10 as indicated by arrow 18 in FIG. 1) of its default position $d_p$, as generally illustrated in dotted lines in FIG. 3, the outer nozzle assembly $42_o$ may be positioned a second lateral distance $d_2$ from the frame 48, which may be less than the first lateral distance $d_1$ due to a curvature of the boom assembly 40. Accordingly, a lateral variance v is formed between the first and second lateral distances $d_1$, $d_2$. This lateral variance v may lead to a misapplication of an agricultural product to the underlying field 20. In addition to creating a variance v, the deflection of the boom arm 50 also creates an offset between the outer nozzle assembly $42_o$ in the default position $d_p$ and the deflected positions $d_f$, $d_a$, which may also lead to inaccuracies during application of the agricultural product to the underlying field 20.

In embodiments that utilize a boom arm 50 that is supported by the frame 48 in a cantilevered orientation (or any other non-uniform orientation), such as the one illustrated in FIG. 3, an outer nozzle assembly $42_o$ will have a greater deflection magnitude from its default position $d_p$ than an inner nozzle assembly $42_i$. Once the deflective force is overcome and/or no longer present, the boom arm 50 will move back towards its default position $d_p$. In some embodiments, the movement of the boom arm 50 may generally occur as harmonic oscillations across the default axis $a_d$ such that the boom arm 50 may move from a position at least partially aft of the default axis $a_d$ to the default position $d_p$ and then to a position at least partially fore of the default position $d_p$ and so on. During the oscillations, an acceleration or speed of an inner nozzle assembly $42_i$ will be less than the outer nozzle assembly $42_o$ due to the varied deflection magnitudes along the boom arm 50.

In some embodiments, a boom speed or boom acceleration of each nozzle assembly 42 along the boom arm 50 may be calculated based on the detected and/or calculated position of various portions of the boom arm 50 at known time periods to define a boom deflection model. The boom deflection model may map a deflection of each nozzle assembly 42 from a default axis $a_d$, a nozzle speed or acceleration, and/or a direction of movement of each nozzle assembly 42 relative to the frame 48. Thus, the model may be used to determine an upcoming activation time for one or more nozzle assemblies 42 to exhaust the agricultural product on a defined target 94. In various embodiments, the boom deflection model may be determined through various geometric equations, lookup tables (LUTs), and/or any other method to determine a position, a speed, and/or an acceleration of each nozzle. Furthermore, the boom deflection model may also provide a prediction of movement of each nozzle at some future time based on the current deflection of the boom assembly, vehicle conditions, and/or any other input. Based on the boom deflection model, the timing of the deposition of the agricultural product may be altered to selectively spray the target 94 and/or a nozzle to be used for exhausting agricultural product towards the target 94 may be chosen. In some instances, by using a boom deflection model, processing requirements may be lessened when compared to calculating each speed at all times, thereby making the system more responsive.

Referring now to FIG. 4, a front perspective view of the boom assembly including a plurality of nozzle assemblies positioned there along is illustrated in accordance with aspects of the present subject matter. In some embodiments, the boom assembly 40 may be configured to support a plurality of nozzle assemblies 42. Each nozzle assembly 42 may, in turn, be configured to dispense the agricultural product stored within the tank 36 (FIG. 1) and/or the rinse tank 38 (FIG. 1) onto a target 94. In several embodiments, the nozzle assemblies 42 may be mounted on and/or coupled to the first and/or second boom arms 50, 52 of the boom assembly 40, with the nozzle assemblies 42 being spaced apart from each other along the lateral direction 56. Furthermore, fluid conduits 84 may fluidly couple the nozzle assemblies 42 to the tank 36 and/or the rinse tank 38. In this respect, as the sprayer 10 travels across the field 20 in the direction of forward travel 18 (FIG. 1) to perform a spraying operation, the agricultural product moves from the tank 26 through the fluid conduits to each of the nozzle assemblies 42. The nozzles 44 may, in turn, dispense or otherwise spray a fan 86 of the agricultural product onto the target 94 when the target 94 is in a application region 88 that corresponds to an area for which the agricultural product exhausted from the nozzle 44 may contact. In various instances, the application region 88 may be varied based on various factors, which can include, but are not limited to, sprayer conditions (e.g., speed of the sprayer 10, direction of travel of the sprayer 10, acceleration of the sprayer 10, etc.), boom conditions (e.g., speed of the nozzle assembly 42, deflection magnitude of the assembly 42 from a default position $d_p$, acceleration of the nozzle assembly 42, direction of movement of the nozzle assembly 42 relative to the frame 46 and/or the underlying field 20, etc.), environmental conditions (e.g., wind speed, wind direction, percent humidity, ambient temperature, etc.), and/or any other conditions.

In some embodiments, the nozzle assembly 42 may include one or more nozzles having varied spray characteristics. As such, the nozzle assembly 42 may vary the application region 88 based on the selected nozzle 46. In various examples, the nozzles 44 within each nozzle assembly 42 may correspond to flat fan nozzles configured to dispense a flat fan of the agricultural product. However, in alternative embodiments, the nozzles 44 may correspond to any other suitable types of nozzles, such as dual pattern nozzles and/or hollow cone nozzles.

As shown, the boom assembly 40 may further include one or more imaging devices 90 configured to capture data indicative of field conditions within the field 20. In several embodiments, the imaging devices 90 may be installed or otherwise positioned on one or more boom sections of the boom assembly 40. As such, each imaging device 90 may have a field of view or detection zone 92 (e.g., as indicated by dashed lines in FIG. 4). In this regard, each imaging device 90 may be able to capture data indicative of objects and/or field conditions within its detection zone 92. For instance, in some embodiments, the imaging devices 90 are object detecting/identifying imaging devices, where the data captured by the imaging devices 90 may be indicative of the location and/or type of plants and/or other objects within the field 20. More particularly, in some embodiments, the data captured by the imaging devices 90 may be used to allow various objects to be detected. For example, the data captured may allow a computing system to distinguish weeds 96 from useful plants within the field 20 (e.g., crops 98). In such instances, the imaging device data may, for instance, be used within a spraying operation to selectively spray or treat a defined target 94, which may include the detected/identified weeds 96 (e.g., with a suitable herbicide) and/or the detected/identified crops 98 (e.g., with a nutrient).

It should be appreciated that the agricultural sprayer 10 may include any suitable number of imaging devices 90 and should not be construed as being limited to the number of imaging devices 90 shown in FIG. 4. Additionally, it should be appreciated that the imaging devices 90 may generally correspond to any suitable sensing devices. For example, each imaging device 90 may correspond to any suitable cameras, such as single-spectrum camera or a multi-spectrum camera configured to capture images, for example, in the visible light range and/or infrared spectral range. Additionally, in various embodiments, the cameras may correspond to a single lens camera configured to capture two-dimensional images or a stereo cameras having two or more lenses with a separate image imaging device for each lens to allow the cameras to capture stereographic or three-dimensional images. Alternatively, the imaging devices 90 may correspond to any other suitable image capture devices and/or other imaging devices capable of capturing "images" or other image-like data of the field 20. For example, the imaging devices 90 may correspond to or include radio detection and ranging (RADAR) sensors, light detection and ranging (LIDAR) sensors, and/or any other practicable device.

In various embodiments, during operation of the sprayer 10, the various boom sections of the boom assembly 40 may travel at different speeds from the chassis 12 and/or move from a default position. For instance, during a turn, the boom sections on the outside of the turn may travel faster than the chassis 12 while the boom sections on the inside of the turn may travel slower than the chassis 12. Similarly, the various boom sections may move fore-to-aft relative to the chassis 12. As such, it is possible that the travel speed and/or the fore-to-aft movement of one or more of the nozzle assemblies 42 may be varied when compared to an instance in which each nozzle assembly 42 is in the default position $d_p$ (FIG. 3). As such, the boom deflection model may be utilized to determine a position, a speed, and/or an acceleration of each nozzle 44. Furthermore, the boom deflection model may also provide a prediction of movement of each nozzle 44 at some future time based on the current deflection of the boom assembly 40, vehicle conditions, environmental conditions, and/or any other input. Based on the boom deflection model, a deposition timing of the agricultural product may be altered from a condition in which the boom assembly 40 is in the default position $d_p$ to selectively spray the target 94 and/or a nozzle 44 to be used for exhausting agricultural product towards the target 94 may be chosen.

Figure 5:
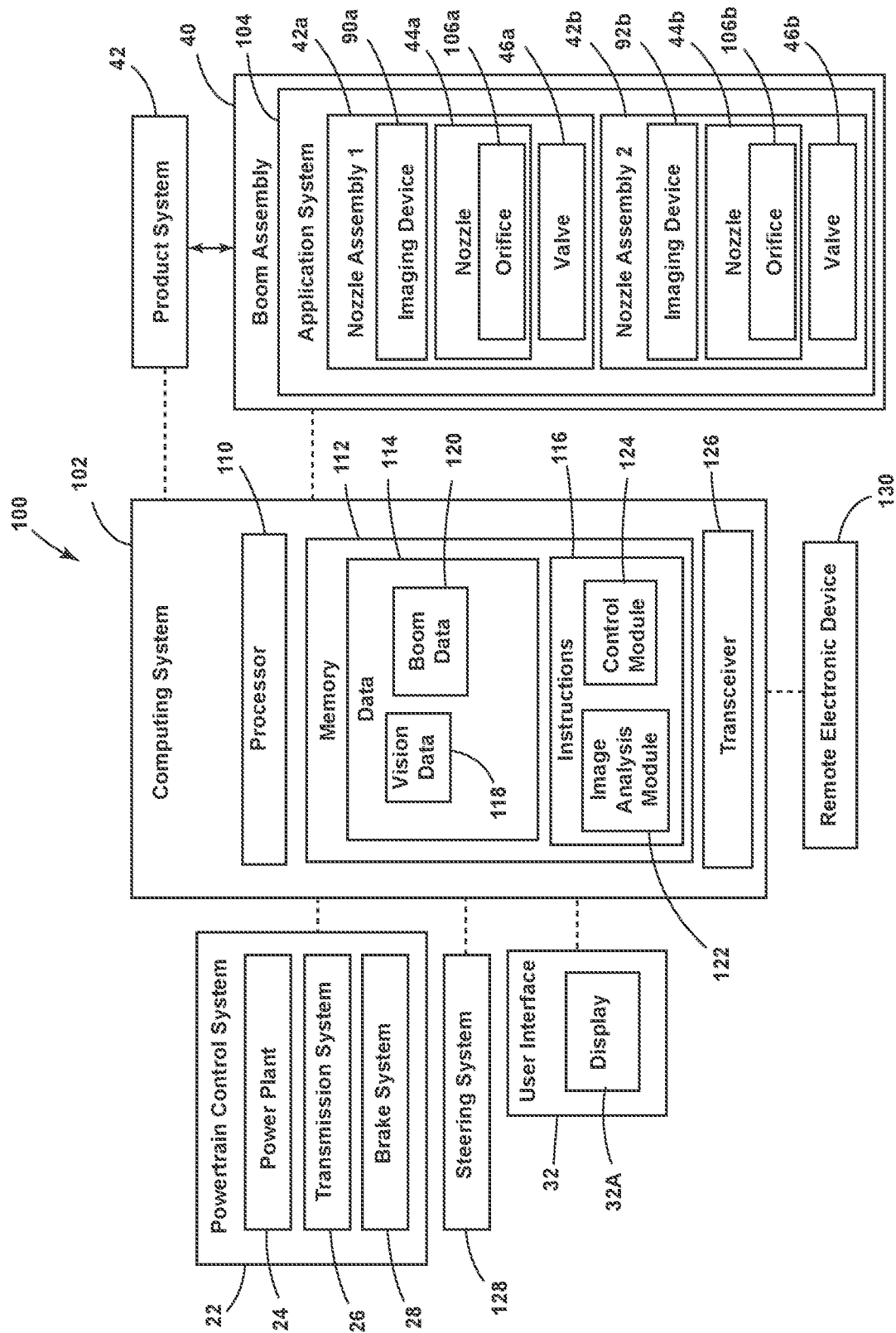
FIG. 5 illustrates a block diagram of components of a system for selectively applying an agricultural product in accordance with aspects of the present subject matter.

Referring now to FIG. 5, a schematic view of a system for operating the sprayer that is configured to apply agricultural product to defined targets is illustrated in accordance with aspects of the present subject matter. In general, the system 100 will be described with reference to the sprayer 10 described above with reference to FIGS. 1-4. However, it should be appreciated by those of ordinary skill in the art that the disclosed system 100 may generally be utilized with agricultural machines having any other suitable machine configuration. Additionally, it should be appreciated that, for purposes of illustration, communicative links, or electrical couplings of the system 100 shown in FIG. 5 are indicated by dashed lines.

As shown in FIG. 5, the system 100 may include a computing system 102 operably coupled with an agricultural product application system 104 that may be configured to dispense an agricultural product from the product system 41 to the field 20 through one or more nozzle assemblies 42a, 42b that is positioned at least partially along the boom assembly 40. As illustrated in FIG. 5, in some instances, the application system 104 can include first and second nozzle assemblies 42a, 42b. However, it will be appreciated that the application system 104 can include any number of nozzle assemblies 42a, 42b without departing from the scope of the present disclosure.

In some embodiments, the first nozzle assembly 42a may be positioned along the boom assembly 40. The first nozzle assembly 42a can include a first valve 46a operably coupled with a first nozzle 44a and configured to control a flow of agricultural product through the first nozzle 44a. A second nozzle assembly 42b may be positioned along the boom assembly 40 on an opposing side of the first nozzle assembly 42a from a frame 48 (FIG. 1) of the boom assembly 40. The second nozzle assembly 42b can include a second valve 46b operably coupled with a second nozzle 44b and configured to control a flow of agricultural product through the second nozzle 44b.

The first and second nozzles 44a, 44b each define an orifice 106a, 106b that may dispense a fan 86 (FIG. 4) of the agricultural product stored within a tank. In some instances, the computing system 102 may be configured to distinguish various objects within the field 20 (e.g., weeds 96 (FIG. 4) from useful plants). In such instances, the application system 104 may perform a spraying operation to selectively spray or treat the defined target 94 from select nozzles 44a, 44b based on the target 94 being positioned within a application region 88 of the respective nozzle 44a, 44b.

In several embodiments, each nozzle 44a, 44b may include a respective valve 46a, 46b for activating the respective nozzle 44a, 44b when a target 94 is detected and determined to be present within a application region 88 of the nozzle 44a, 44b. The valves 46a, 46b can further include restrictive orifices, regulators, and/or the like to regulate the flow of agricultural product from the product tank 36 and/or the rinse tank 38 to each orifice 106a, 106b. In various embodiments, the valves 46a, 46b may be configured as electronically controlled valves that are controlled by a Pulse Width Modulation (PWM) signal for altering the application rate of the agricultural product.

In addition, one or more imaging devices 90a, 90b may be associated with each respective nozzle 44a, 44b and configured to capture images of a portion of the field 20. In various embodiments, each imaging device 90a, 90b may have a detection zone 92 (FIG. 4) that at least partially overlaps with a application region 88 (FIG. 4) of a nozzle 44a, 44b such that the imaging device 90a, 90b can provide data related to an object being positioned externally and/or internally of the application region 88 of the fan 86. As indicated above, in several embodiments, the one or more imaging devices 90a, 90b may correspond to a camera for capturing two-dimensional and/or three-dimensional images of the field 20. In several embodiments, the computing system 102 may be configured to receive and process data captured by the imaging devices 90a, 90b to allow one or more objects within imaged portions of the field 20 to be determined. For instance, the computing system 102 may be configured to execute one or more suitable image processing algorithms for identifying one or more targets 94 (FIG. 6) and/or one or more reference points 108 (FIG. 6) within the data provided to the computing system 102. In turn, based on the reference point 108 within successive frames of data (i.e., two imaged portions of the field 20 that are sensed at off-set times), the computing system 102 may utilize geometric equations, lookup tables (LUTs), and/or any other method to determine the boom deflection model. Based on the boom deflection model, the timing of the deposition of the agricultural product may be altered to selectively spray the target 94.

In general, the computing system 102 may comprise any suitable processor-based device, such as a computing device or any suitable combination of computing devices. Thus, in several embodiments, the computing system 102 may include one or more processor 110 and associated memory devices 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory devices 112 of the computing system 102 may generally comprise memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor 110, including data 114 that can be retrieved, manipulated, created, and/or stored by the processor 110 and instructions 116 that can be executed by the processor 110, when implemented by the processor 110, configure the computing system 102 to perform various computer-implemented functions, such as one or more aspects of the image processing algorithms and/or related methods described herein. In addition, the computing system 102 may also include various other suitable components, such as a communications circuit or module, one or more input/output channels, a data/control bus, and/or the like.

It will be appreciated that, in several embodiments, the computing system 102 may correspond to an existing controller of the agricultural machine 10, or the computing system 102 may correspond to a separate processing device. For instance, in some embodiments, the computing system 102 may form all or part of a separate plug-in module or computing device that is installed relative to the sprayer 10 or boom assembly 40 to allow for the disclosed system 100 and method to be implemented without requiring additional software to be uploaded onto existing control devices of the sprayer 10 or boom assembly 40.

In several embodiments, the data 114 may be information received and/or generated by the computing system 102 that is stored in one or more databases. For instance, as shown in FIG. 5, the memory device 112 may include a vision database 118 for storing vision-based data received from the imaging devices 90a, 90b. For example, the imaging devices 90a, 90b may be configured to continuously or periodically capture images of the field 20 or other image-like data associated with the field 20. In such embodiments, the data transmitted to the computing system 102 from the imaging devices 90a, 90b may be stored within the vision database 118 for subsequent processing and/or analysis. It should be appreciated that, as used herein, the terms vision-based data or image-like data may include any suitable type of data received from the imaging devices 90a, 90b that allows for the objects and/or field conditions of a field 20 to be analyzed, including photographs or other images, RADAR data, LIDAR data, and/or other image-related data (e.g., scan data and/or the like).

Further, as shown in FIG. 5, the memory 112 may include a boom database 120, which may be configured to store data and/or algorithms related to one or more boom assemblies that may be used by the system 100. For example, the boom database 120 may be configured to receive inputs related to and/or detect various boom characteristics, such as a length of the boom, a number of nozzles 44a, 44b along the boom, and/or any other data. In addition, the boom database 120 may include various algorithms, LUTs, etc. that are associated with each boom based on the boom characteristics.

In several embodiments, the instructions 116 stored within the memory 112 of the computing system 102 may be executed by the processor 110 to implement an image analysis module 122. In general, the image analysis module 122 may be configured to process/analyze the images received from the imaging devices 90a, 90b and/or the data deriving therefrom to estimate or determine a boom deflection model. Specifically, in several embodiments, the image analysis module 122 may be configured to execute one or more image processing algorithms to determine a magnitude of deflection and/or a direction of movement to generate the boom deflection model. For example, in some embodiments, the image analysis module 122 may receive one or more imaged portions of the field 20 from the imaging devices 90a, 90b, determine a reference point 108 within the image portions of the field 20, determine a speed of the reference point 108, and determine a direction of the reference point 108. Based on the speed and direction of the reference points 108 determined by the imaging devices 90a, 90b along the boom assembly 40 and a known position of the imaging devices 90a, 90b along the boom, a boom deflection model may be determined. With the generated boom deflection model, the computing system 102 may estimate a time at which a target 94 may be within a application region 88 of a nozzle 44a, 44b.

Referring still to FIG. 5, in some embodiments, the instructions 116 stored within the memory device 112 of the computing system 102 may also be executed by the processor 110 to implement a control module 124. In general, the control module 124 may be configured to electronically control the operation of one or more components of the agricultural machine 10. For instance, in several embodiments, the control module 124 may be configured to control the operation of each nozzle assembly 42a, 42b based on the determined boom deflection model and a location of the target 94. For instance, based on the boom deflection model, the control module 124 may time an activation of a valve 46a, 46b to control the deposition of the agricultural product to selectively spray or treat the target 94 from a defined nozzle 44a, 44b. In some instances, by using the data provided by the imaging devices 90a, 90b associated with each nozzle 44a, 44b, a more accurate application of agricultural product may be applied to various targets 94 within the field 20.

Further, as shown in FIG. 5, the computing system 102 may also include a transceiver 126 to allow for the computing system 102 to communicate with any of the various other system components described herein. For instance, one or more communicative links or interfaces (e.g., one or more data buses) may be provided between the transceiver 126 and the application system 104. In such instances, the images or other vision-based data captured by the imaging devices 90a, 90b may be transmitted from the imaging devices 90a, 90b to the computing system 102. In addition, the computing system 102 may provide instructions to activate/deactivate each valve 46a, 46b at various times to selectively spray or treat the target 94 based on the boom deflection model.

Similarly, one or more communicative links or interfaces may be provided between the transceiver 126 and the powertrain control system 22 that includes the power plant 24, the transmission system 26, and the brake system 28. Through the usage of any of these systems, the vehicle computing system 102 may collect data related to one or more vehicle conditions, such as speed variations that may cause the boom assembly 40 to move from its neutral position. In some instances, in addition to the computing system 102 determining a speed and direction of the boom arm deflection, the computing system 102 may also predict a future position of the boom based on the boom deflection model and the detected vehicle conditions. In turn, the computing system 102 may determine an upcoming activation time with the upcoming activation time defining a time in which a detected target 94 is to be positioned within a first application region 88.

The power plant 24 is configured to vary the output of the engine to control the speed of the vehicle 10. For example, the power plant 24 may vary a throttle setting of the engine, a fuel/air mixture of the engine, a timing of the engine, and/or other suitable engine parameters to control engine output. In addition, the transmission system 26 may adjust gear selection within a transmission system 26 to control the speed of the vehicle 10. Furthermore, the brake system 28 may adjust braking force, thereby controlling the speed of the vehicle 10. While the illustrated powertrain control system 22 includes the power plant 24, the transmission system 26, and the brake system 28, it should be appreciated that alternative embodiments may include one or two of these systems, in any suitable combination. Further embodiments may include a powertrain control system 22 having other and/or additional systems to facilitate adjusting the speed of the vehicle 10.

Additionally or alternatively, one or more communicative links or interfaces (e.g., one or more data buses) may be provided between the transceiver 126 and a steering system 128 configured to control a direction of the vehicle 10 through manipulation of one or more wheels 14, 16 (FIG. 1) (or tracks). The steering system 128 may include a steering system sensor to provide data related to a steering direction of the vehicle 10 and/or a torque on the steering wheel indicating an operator's intention for manipulating the steering system 128. In some instances, in addition to the computing system 102 determining a speed and direction of the boom arm deflection, the computing system 102 may also predict a future position of the boom based on the steering conditions in addition to or in lieu of the vehicle conditions provided by the powertrain control system 22.

Further, one or more communicative links or interfaces may be provided between the transceiver 126 and a user interface, such as a user interface 32 housed within the cab 30 of the sprayer 10 or at any other suitable location. The user interface 32 may be configured to provide feedback to the operator of the agricultural machine 10. Thus, the user interface 32 may include one or more feedback devices, such as display screens 32A, speakers, warning lights, and/or the like, which are configured to communicate such feedback. In addition, some embodiments of the user interface 32 may include one or more input devices 34 (FIG. 1), such as touchscreens, keypads, touchpads, knobs, buttons, sliders, switches, mice, microphones, and/or the like, which are configured to receive user inputs from the operator.

Still further, one or more communicative links or interfaces may be provided between the transceiver 126 and a remote electronic device 130. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 130 may also include a display for displaying information to a user. For instance, the electronic device 130 may display one or more user interfaces and may be capable of receiving remote user inputs. In addition, the electronic device 130 may provide feedback information, such as visual, audible, and tactile alerts and/or allow the operator to alter or adjust one or more components of the vehicle 10 or the boom assembly 40 through usage of the remote electronic device 130. It will be appreciated that the electronic device 130 may be any one of a variety of computing devices and may include a processor and memory. For example, the electronic device 130 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In operation, the one or more imaging devices 90a, 90b positioned along the boom may provide data related to imaged portions of an agricultural field 20 (FIG. 1) to the computing system 102. The one or more imaging devices 90a, 90b may provide vision-based data within various detection zones 92 (FIG. 4) that may be associated with each respective nozzle 44a, 44b along the boom assembly 40. Based on the data captured by the one or more imaging devices 90a, 90b, the computing system 102 may be configured to identify a target 94 within the imaged portions of the agricultural field 20.

In addition, the computing system 102 may identify one or more reference points 108 within the first imaged portion 140 of the agricultural field 20. The reference point 108 may be identified within successive imaged portions that are detected at varied times from one another. Based on the distance that each reference point 108 moves from an origin and a defined time between the first imaged portion 140 and the second imaged portion 142, the computing system 102 may determine a speed of movement of the boom assembly 40 as the reference point may be generally stationary and/or a direction of movement of the boom assembly 40 as the reference point may be generally stationary. As provided herein, an imaging device 90a, 90b may be associated with each nozzle 44a, 44b such that the speed and direction of each nozzle 44a, 44b may be determined. In some instances, the computing system 102 may activate the first valve 46a when the target 94 is within a first application region 88.

In some embodiments, during operation, the computing system 102 may also receive data related to a third imaged portion 144 of the agricultural field 20 from the second imaging device 90b. In some instances, the first imaged portion 140 and the third imaged portion 144 may be captured at a common time. Alternatively, the time in which the first imaged portion 140 is captured may be offset from the time at which the third imaged portion 144 is detected. The second imaging device 90b may provide vision-based data within various detection zones 92 that may be associated with a second nozzle assembly 42b along the boom assembly 40. Based on the data captured by the second imaging device 90b (or the first imaging device 90a), the computing system 102 may be configured to identify a target 94 within the third imaged portion 144 of the agricultural field 20.

In addition, the computing system 102 may identify one or more reference points 108 within the third imaged portion 144 of the agricultural field 20. The computing system 102 may also receive data related to a fourth imaged portion 146 of the agricultural field 20 from the second imaging device 90b. The reference point 108 may be identified within both the third imaged portion 144 and the fourth imaged portion 146 with the third imaged portion 144 and the fourth imaged portion 146 being detected at varied times from one another. Based on the distance that each reference point 108 moves from an origin and a defined time between the third imaged portion 144 and the fourth imaged portion 146, the computing system 102 may determine a speed of movement of the boom assembly 40 as the reference point 108 may be generally stationary and/or a direction of movement of the boom assembly 40 as the reference point 108 may be generally stationary. In some instances, the computing system 102 may activate the second valve 46b when the target 94 is within a second application region 88.

Additionally or alternatively, based on the speed and direction of movement of the reference points 108 determined by each imaging device 90a, 90b along each boom and a known position of each imaging device 90a, 90b along the boom, a boom deflection model may be determined. Based on the determination that a target 94 is present within the field 20 and the detected boom deflection model that defines a deflection magnitude (e.g., shape), speed of movement of the nozzles 44a, 44b positioned along the boom assembly 40, and/or a direction of movement of the nozzles 44a, 44b positioned along the boom assembly 40, the system 100 may perform a spraying operation to selectively spray or treat the target 94 while the target 94 is within a fan 86 of a nozzle 44a, 44b. As such, a more accurate application of the agricultural product to the target 94 may be accomplished.

It will be appreciated that, although the various control functions and/or actions will generally be described herein as being executed by the computing system 102, one or more of such control functions/actions (or portions thereof) may be executed by a separate computing system 102 or may be distributed across two or more computing systems (including, for example, the computing system 102 and a separate computing system). For instance, in some embodiments, the computing system 102 may be configured to acquire data from the imaging devices 90a, 90b for subsequent processing and/or analysis by a separate computing system (e.g., a computing system associated with a remote server). In other embodiments, the computing system 102 may be configured to execute the image analysis module 122 to determine and/or monitor one or more objects and/or field conditions within the field 20, while a separate computing system (e.g., a vehicle computing system associated with the agricultural machine 10) may be configured to execute the control module 124 to control the operation of the agricultural machine 10 based on data and/or instructions transmitted from the computing system 102 that are associated with the monitored objects and/or field conditions.

Figure 6:
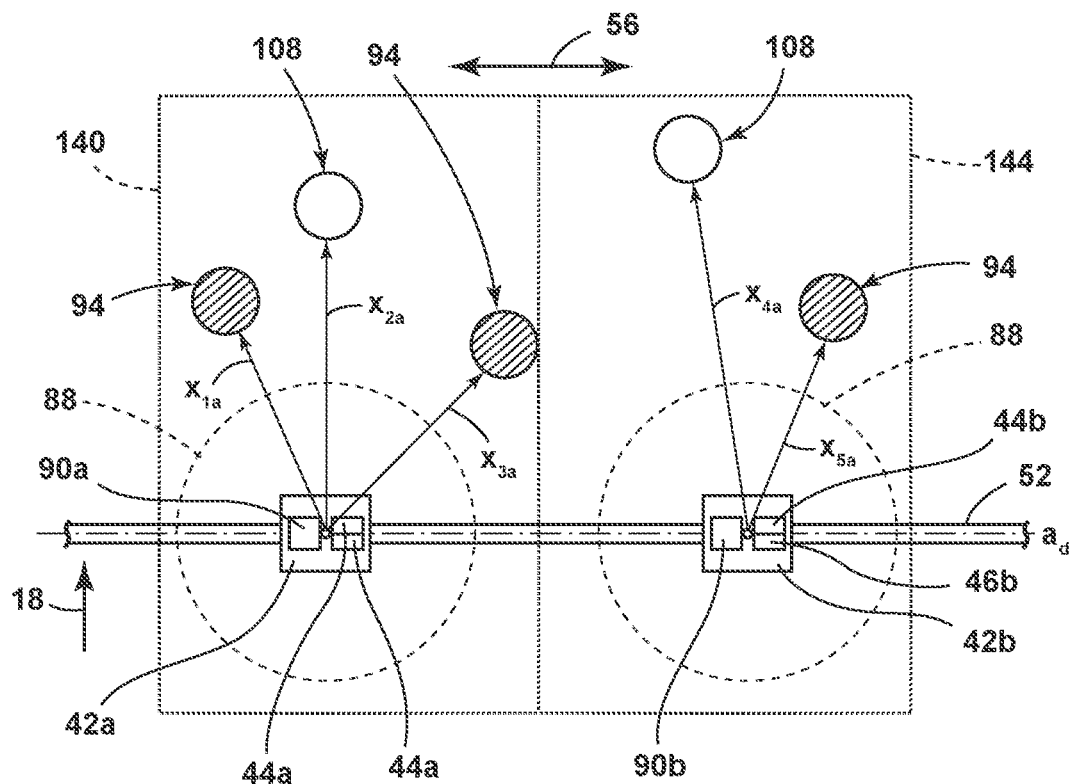
FIG. 6 is a simplified schematic representation of a boom assembly including a first nozzle assembly and a second nozzle assembly each positioned a first distance from various objects in accordance with aspects of the present subject matter.
Figure 7:
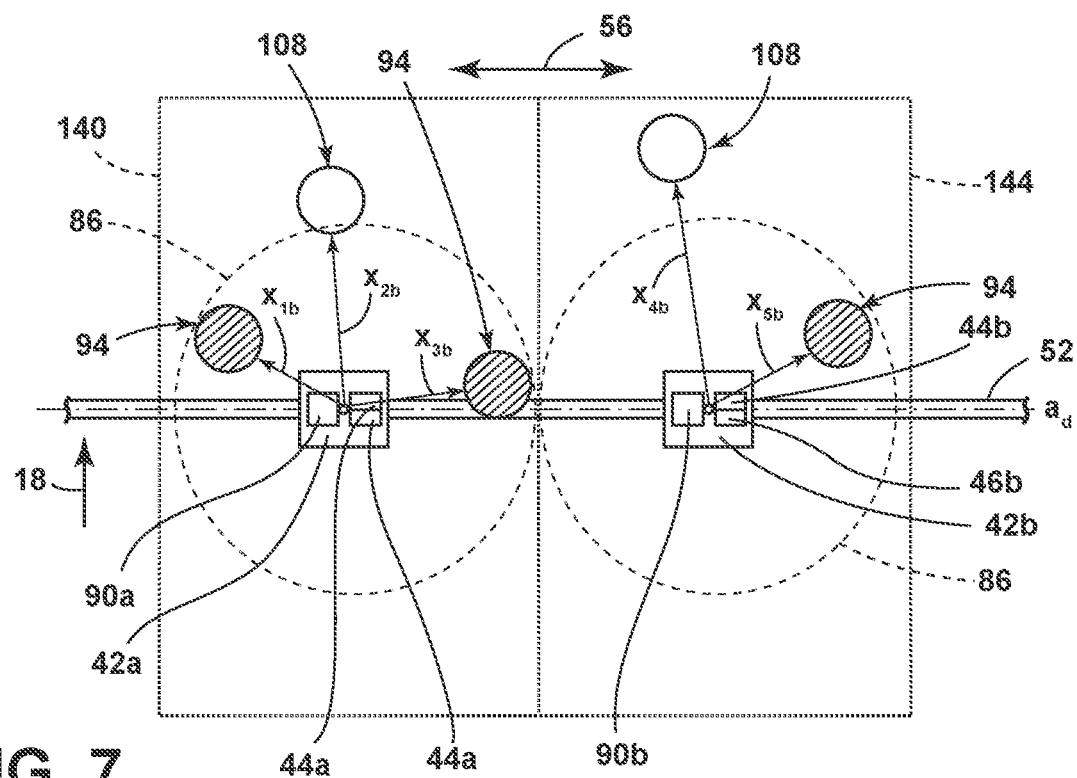
FIG. 7 is a simplified schematic representation of a boom assembly including a first nozzle assembly and a second nozzle assembly each positioned a second distance from the various objects of FIG. 6 in accordance with aspects of the present subject matter.
Figure 8:
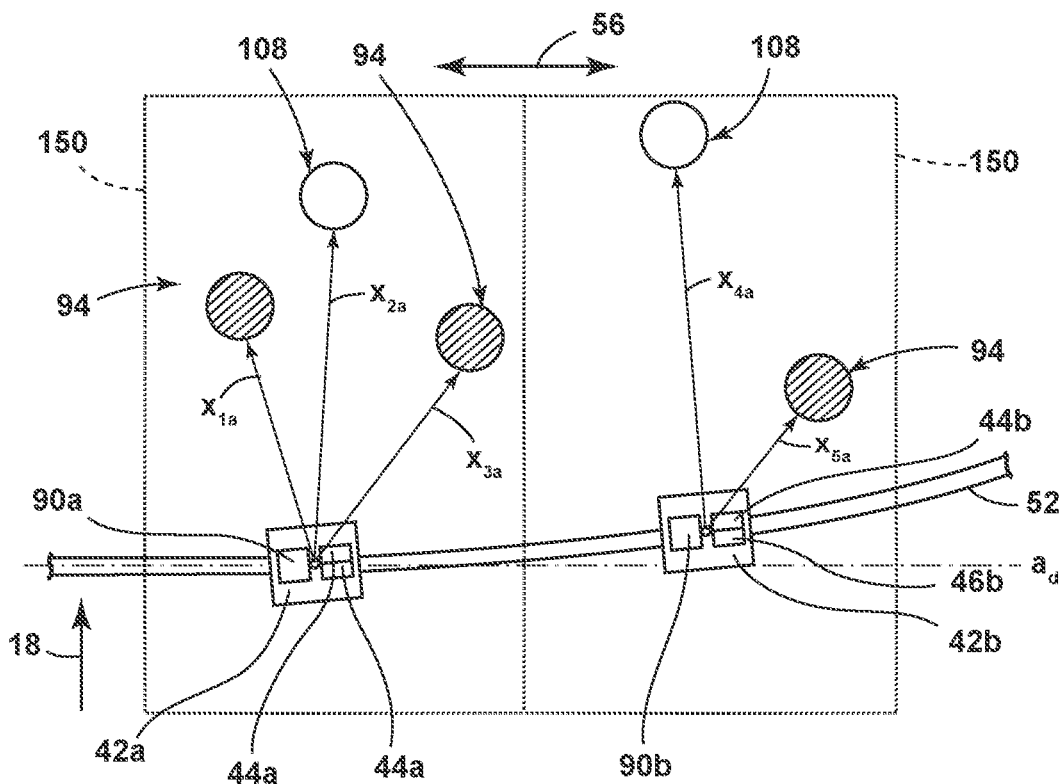
FIG. 8 is a simplified schematic representation of a deflected boom assembly including a first nozzle assembly and a second nozzle assembly each positioned a first distance from various objects in accordance with aspects of the present subject matter.
Figure 9:
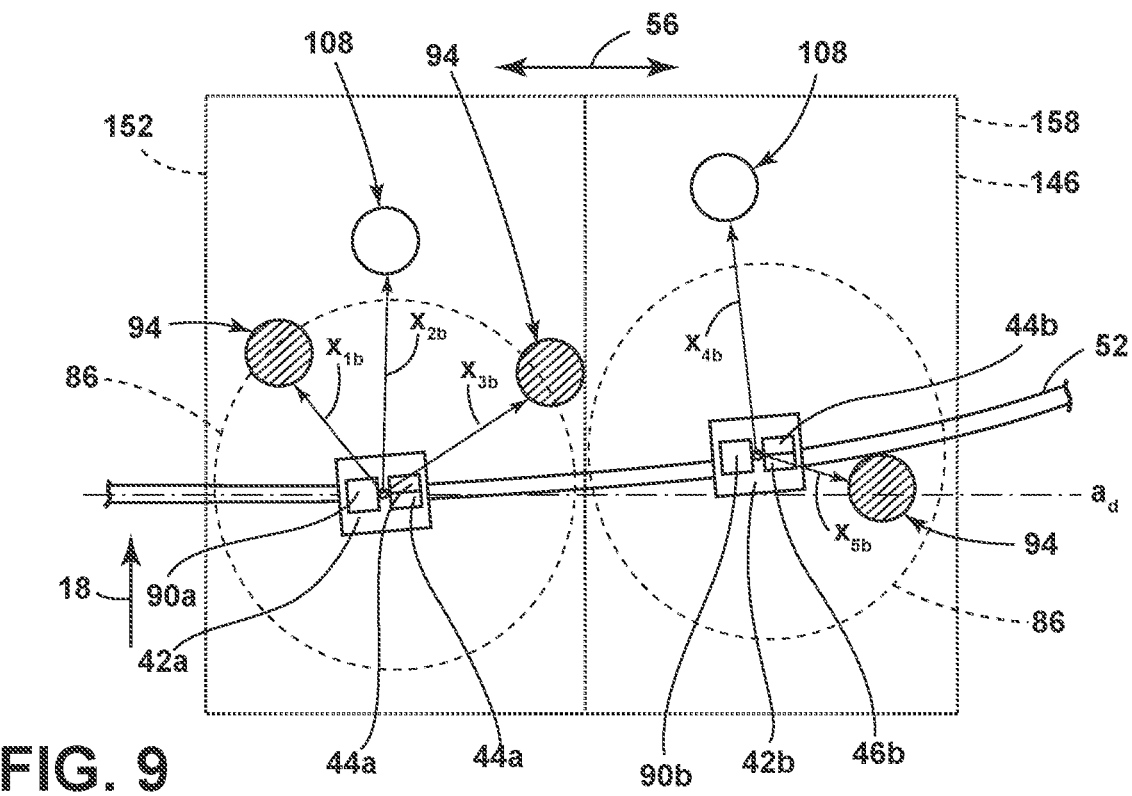
FIG. 9 is a simplified schematic representation of a deflected boom assembly including a first nozzle assembly and a second nozzle assembly each positioned a second distance from the various objects of FIG. 8 in accordance with aspects of the present subject matter.
Figure 10:
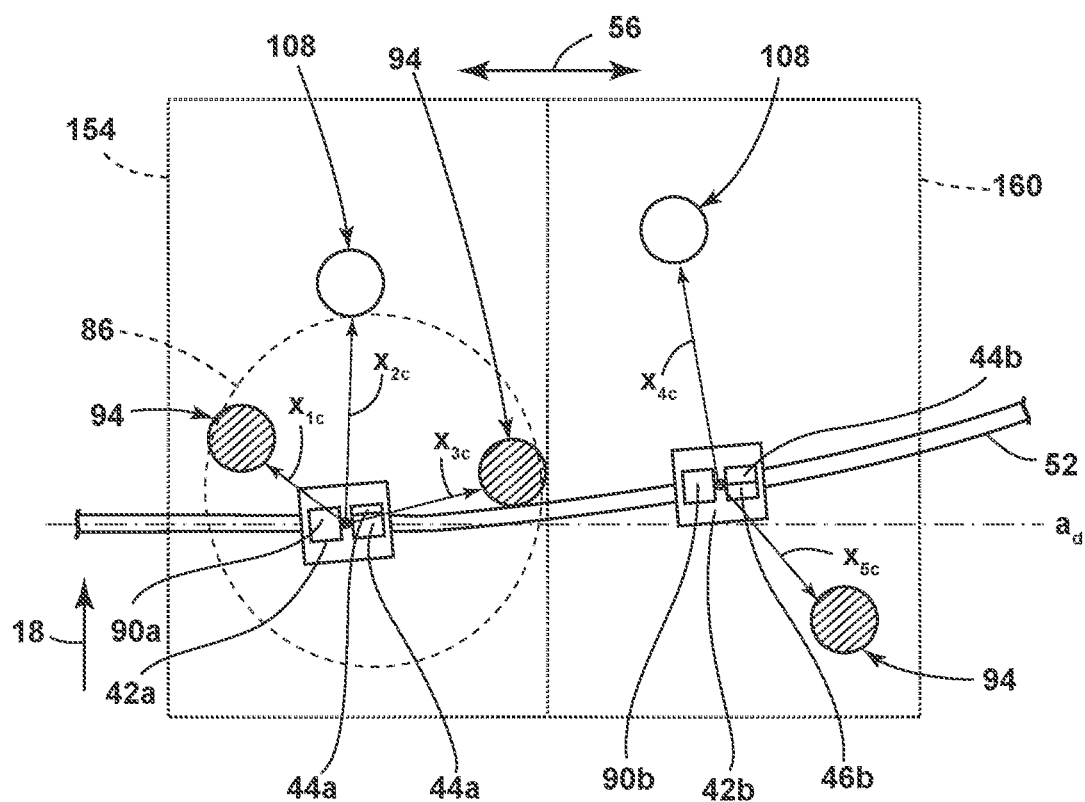
FIG. 10 is a simplified schematic representation of a deflected boom assembly including a first nozzle assembly and a second nozzle assembly each positioned a third distance from the various objects of FIG. 8 in accordance with aspects of the present subject matter.

Referring now to FIGS. 6-10, various schematic views of a first nozzle 44a and a second nozzle 44b positioned along a boom arm 50 are illustrated in accordance with various aspects of the present disclosure. Specifically, FIGS. 6 and 7 illustrate an embodiment of a spray application of the system 100 with the first boom arm 50 generally extending along in a default position $d_p$. FIGS. 8-10 illustrate an embodiment of a spray application of the system 100 with the first boom arm 50 generally extending in an aft direction $d_a$.

With reference to FIGS. 6-10, the system 100 may include a first nozzle assembly 42a that includes a first imaging device 90a, a first nozzle 44a, and a first valve 46a. The system 100 may also include a second nozzle assembly 42b that includes a second imaging device 90b, a second nozzle 44b, and a second valve 46b. Each of the first and second imaging devices 90a, 90b may be able to capture data indicative of one or more objects within its detection zone 92. For instance, in some embodiments, the data captured by the imaging devices 90a, 90b is indicative of the location and/or type of plants within the field 20. Further, in some embodiments, the data captured by the imaging devices 90a, 90b may be used to allow targets 94 to be distinguished within the field 20 (e.g., weeds 96 (FIG. 4) versus crops 98 (FIG. 4)). Additionally or alternatively, the computing system 102 may identify one or more references points 108 within the data captured by the imaging devices 90a, 90b. Based on the positional changes of the reference points 108 and a known position of each imaging device 90a, 90b along the boom arm 50, a boom deflection model may be determined. Based on the determination that a target 94 is present within the field 20 and a determined boom deflection model, the system 100 may perform a spraying operation to selectively spray or treat the target 94 while the target 94 is within a defined application region 88 of a nozzle 44a, 44b.

With further reference to FIGS. 6 and 7, in several embodiments, the first imaging device 90a may provide the computing system 102 with data indicative of a first imaged portion 140 (FIG. 6) of the field 20 and a second imaged portion 142 (FIG. 7) of the field 20. Likewise, the second imaging device 90b may provide the computing system 102 with data indicative of a third imaged portion 144 (FIG. 6) of the field 20 and a fourth imaged portion 146 (FIG. 7) of the field 20.

As illustrated in FIG. 6, a pair of targets 94 are identified as locations that are to have an agricultural product applied thereto by the first nozzle 44a and a single target 94 to have an agricultural product applied thereon by the second nozzle 44b. However, each of the pair of targets 94 is positioned an initial distance $X_{1a}$, $X_{3a}$ that is external of the first application region 88. Likewise, the target 94 is positioned an initial distance $X_{5a}$ that is external of the second application region 88. As such, the computing system 102 may monitor successive imaged portions of the field 20 to determine when each target 94 is positioned within a respective application region 88.

As illustrated in FIG. 7, as the sprayer 10 (FIG. 1) travels along the direction of forward travel 18, the reference point 108 moves from a first distance $X_{2a}$ (FIG. 6) from the first nozzle assembly 42a in the first imaged portion 140 of the field 20 to a second distance $X_{2b}$ from the first nozzle assembly 42a in the second imaged portion 142 of the field 20 provided by the first imaging device 90a. Based on the reference point 108 within successive frames of data, the computing system 102 may utilize geometric equations, LUTs, and/or any other method to determine that the first and second targets 94 are a distance $X_{2b}$ from the first nozzle 44a that is within the application region 88 of the first nozzle 44a. In such instances, the computing system 102 may activate the valve 46a of the first nozzle assembly 42a to apply the agricultural product to the first target 94 and the second target 94.

Likewise, as the sprayer 10 (FIG. 1) travels along the direction of forward travel 18, the reference point 108 moves from a first distance $X_{4a}$ (FIG. 6) from the second nozzle assembly 42b in the third imaged portion 144 of the field 20 to a second distance $X_{4b}$ from the second nozzle assembly 42b in the fourth imaged portion 146 of the field 20 provided by the second imaging device 90b. Based on the reference point 108 within successive frames of data, the computing system 102 may utilize geometric equations, LUTs, and/or any other method to determine that the third target 94 is a distance $X_{5b}$ from the second imaging device 90b that is within the application region 88 of the second nozzle 44b. In such instances, the computing system 102 may activate the valve 46b of the second nozzle assembly 42b to apply the agricultural product to the third target 94.

Referring now to FIGS. 8-10, in some instances, the boom arm 50 may be deflected from the default position, which is generally illustrated in FIGS. 6 and 7. In such instances, the timing of the activation of the first nozzle assembly 42a and/or the second nozzle assembly 42b may be varied based on the speed of the first nozzle assembly 42a, the direction of movement of the first nozzle assembly 42a, the speed of the second nozzle assembly 42b, the direction of movement of the second nozzle assembly 42b, and/or differences between the speed and/or direction of the first nozzle assembly 42a compared to the second nozzle assembly 42b, which may all be identified within the boom deflection model.

In the embodiments illustrated in FIGS. 8-10, the first imaging device 90a may provide the computing system 102 with data indicative of a first imaged portion 150 (FIG. 8) of the field 20, a second imaged portion 152 (FIG. 9) of the field 20, and a third imaged portion 154 (FIG. 10) of the field 20. Likewise, the second imaging device 90b may provide the computing system 102 with data indicative of a fourth imaged portion 156 (FIG. 8) of the field 20, a fifth imaged portion 158 (FIG. 9) of the field 20, and a sixth imaged portion 160 (FIG. 10) of the field 20.

As illustrated in FIG. 8, a pair of targets 94 are illustrated that are to have an agricultural product applied thereon by the first nozzle 44a and a single third target 94 to have an agricultural product applied thereon by the second nozzle 44b. As illustrated, each of the pair of targets 94 is positioned at an initial distance $X_{1a}$, $X_{3a}$ that is external from a application region 88 of the first fan 86. Likewise, the third target 94 is positioned at an initial distance $X_{5a}$ that is external from a application region 88 of the second fan 86.

As illustrated in FIG. 9, as the sprayer 10 (FIG. 1) travels along the direction of forward travel 18, the reference point 108 moves from a first distance $X_{2a}$ (FIG. 8) from the first nozzle assembly 42a in the first imaged portion 150 to a second distance $X_{2b}$ from the first nozzle assembly 42a in the second imaged portion 152 provided by the first imaging device 90a. Based on the reference point 108 within successive frames of data, the computing system 102 may utilize geometric equations, LUTs, and/or any other method to determine a speed and direction of the first nozzle assembly 42a. Similarly, as the sprayer 10 travels along the direction of forward travel 18, the reference point 108 moves from a first distance $X_{4a}$ (FIG. 8) from the second nozzle assembly 42b in the fourth imaged portion 156 to a second distance $X_{4b}$ from the second nozzle assembly 42b in the fifth imaged portion 158 provided by the second imaging device 90b. Based on the reference point 108 within successive frames of data, the computing system 102 may utilize geometric equations, LUTs, and/or any other method to determine a speed and direction of the second nozzle assembly 42b. In the illustrated embodiments, due to the deflection of the boom arm 50, the deflection of the first nozzle assembly 42a may be less than the speed of the second nozzle assembly 42b.

Due to the variance in deflection of the first nozzle assembly 42a relative to the second nozzle assembly 42b, as illustrated in FIG. 9, the third target 94 may be positioned a second distance $X_{5b}$ that is within the application region 88 of the second fan 86 while the first and second targets 94 may be positioned at a second distance $X_{1b}$, $X_{3b}$ that is outward of the application region 88 of the first fan 86. As such, the computing system 102 may activate the second valve 46b to apply the agricultural product to the third target 94 while the first valve 46a remains deactivated.

As illustrated in FIG. 10, based on a third imaged portion 154 of the field provided by the first imaging device 90a and/or a sixth imaged portion 160 of the field 20 provided the second imaging device 90b (and/or the determined boom deflection model), the computing system 102 may determine that the first and second targets 94 are positioned at a distance $X_{1c}$, $X_{3c}$ that is within a application region 88 of the first fan 86. As such, the computing system 102 may activate the first valve 46a to apply the agricultural product to the first target 94 and the second target 94 while the second valve 46b is returned to a deactivated state as the agricultural product has already been applied.

It will be appreciated that the data provided by the computing system 102 may be analyzed to determine the movement of the boom assembly 40. In turn, the computing system 102 may alter an activation time of the first nozzle assembly 42a and/or the second nozzle assembly 42b. In addition, in some instances, the computing system 102 may be configured to determine an upcoming activation time based on the boom deflection model. In such instances, the upcoming activation time defines a time in which a detected target 94 is positioned within the first fan 86 of agricultural product exhausted from the first nozzle 44a and/or within the second fan 86 of agricultural product exhausted from the second nozzle 44b. As provided herein, the boom deflection model may determine a speed of movement and a direction of movement for each nozzle 44a, 44b. As such, the computing system 102 may determine that an outboard nozzle 44b is moving faster than an inboard nozzle 44a. In turn, the computing system 102 may be able to activate the second valve 46b before the first valve 46a even when both targets 94 are positioned generally along a common axis that is parallel to the default axis $a_d$.

Additionally or alternatively, the computing system 102 may activate the first valve 46a when the first target 94 is projected to pass through a first application region 88 a second time due to oscillation of the boom assembly 40 based on the boom deflection model. Similarly, the computing system 102 may activate the second valve 46b when the second target 94 is projected to pass through a second application region 88 a second time due to oscillation of the boom assembly 40 based on the boom deflection model. In such instances, multiple applications of the agricultural product may be applied to a common target 94, and/or multiple attempts may be performed on a single target 94 to further ensure that the target 94 was contacted by the agricultural product.

Figure 11:
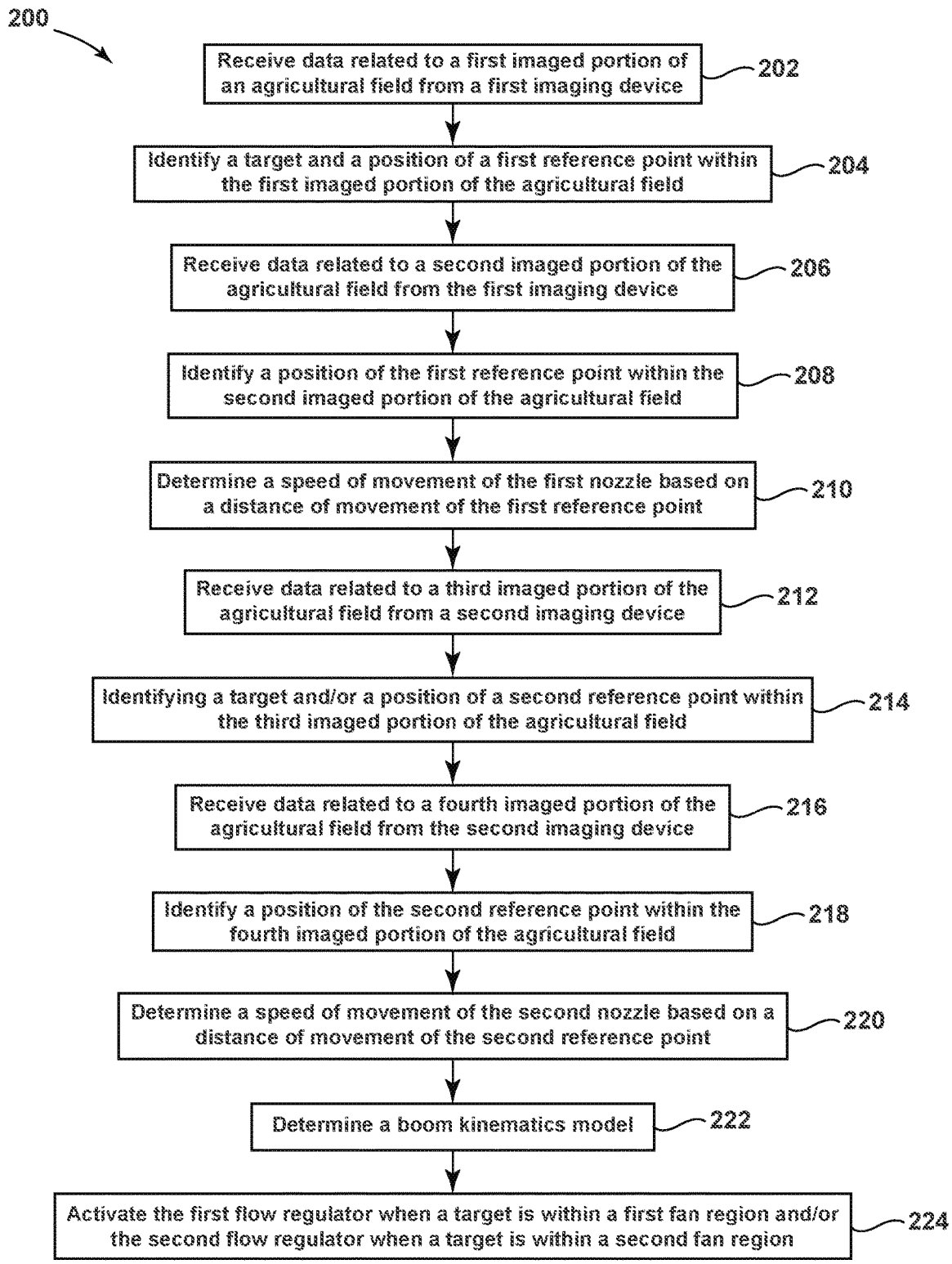
FIG. 11 illustrates a flow diagram of a method of selectively applying an agricultural product in accordance with aspects of the present subject matter.

Referring now to FIG. 11, a flow diagram of some embodiments of a method 200 for selectively applying an agricultural product is illustrated in accordance with aspects of the present subject matter. In general, the method 200 will be described herein with reference to the sprayer 10 and the system 100 described above with reference to FIGS. 1-10. However, it will be appreciated by those of ordinary skill in the art that the disclosed method 200 may generally be utilized with any suitable agricultural sprayer 10 and/or may be utilized in connection with a system having any other suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (202), the method 200 can include receiving data related to a first imaged portion of an agricultural field from a first imaging device. As provided herein, the first imaging device may be associated with a first nozzle assembly. The first nozzle assembly can include a first valve operably coupled with a first nozzle and configured to control a flow of agricultural product through the first nozzle.

At (204), the method 200 can include identifying a target and a position of a first reference point within the first imaged portion of the agricultural field. In various examples, the first reference point can be a detected object within the first imaged portion of the agricultural field and the second imaged portion of the agricultural field that is remote from the first target. Additionally or alternatively, the first reference point is the first target within the first imaged portion of the agricultural field and the second imaged portion of the agricultural field.

At (206), the method 200 can include receiving data related to a second imaged portion of the agricultural field from the first imaging device. The first imaged portion may be captured at a first time and the second imaged portion may be captured at a second time with the second time being a defined interval after the first time. In addition, the first imaged portion and the second imaged portion may each include the first reference point.

At (208), the method 200 can include identifying a position of the first reference point within the second imaged portion of the agricultural field. Next, at (210), the method 200 can include determining a speed of movement of the first nozzle based on a distance of movement of the first reference point. As provided herein, the computing system may be configured to execute one or more suitable image processing algorithms for determining one or more reference points within the data provided to the computing system. In turn, based on the reference point within successive frames of data (i.e., two portions of the field that are sensed at off-set times), the computing system may utilize geometric equations, LUTs, and/or any other method to determine a speed of movement and/or a direction of movement of the first nozzle.

In addition at (212), the method 200 can include receiving data related to a third imaged portion of an agricultural field from a second imaging device. As provided herein, the second imaging device may be associated with a second nozzle assembly. The second nozzle assembly can include a second valve operably coupled with a second nozzle and configured to control a flow of agricultural product through the second nozzle.

At (214), the method 200 can include identifying a second target and/or a position of a second reference point within the first imaged portion of the agricultural field. At (216), the method 200 can include receiving data related to a fourth imaged portion of the agricultural field from the second imaging device. It will be appreciated that the first imaged portion, the second imaged portion, the third imaged portion, and the fourth imaged portion may all be generated by a common imaging device without departing from the scope of the present disclosure.

At (218), the method 200 can include identifying a position of the second reference point within the fourth imaged portion of the agricultural field. Next, at (220), the method 200 can include determining a speed of movement of the second nozzle based on a distance of movement of the second reference point.

At (222), the method 200 includes determining a boom deflection model. As provided herein, the boom deflection model may predict or determine a magnitude of fore-aft deflection (and/or any other direction) of the boom assembly and/or a speed of movement of the first nozzle and the second nozzle relative to the underlying field and/or relative to the vehicle. In addition, the boom deflection model may predict the upcoming movement of the boom assembly based on the oscillation characteristics of the boom and/or any other factor. In some instances, a boom deflection magnitude and/or a boom movement direction may be determined based on the speed of movement of the first nozzle and the position of the first imaging device along a boom assembly. Additionally or alternatively, a boom deflection magnitude and/or a boom movement direction may be determined by comparing the speed of movement of the first nozzle relative to the speed of movement of the second nozzle and a position of the second imaging device along the boom assembly.

At (224), the method 200 includes activating the first valve when a target is within a first application region and/or the second valve when a target is within a second application region. In some instances, the computing system may be able to activate the second valve sooner than the first valve even when both targets are positioned generally along a common axis that is parallel to a default axis. Additionally or alternatively, the computing system may activate the first valve when the first target is projected to pass through a first application region a second time due to oscillation of the boom assembly based on the boom deflection model. Similarly, the computing system may activate the second valve when the second target is projected to pass through a second application region a second time due to oscillation of the boom assembly based on the boom deflection model. In such instances, multiple applications of the agricultural product may be applied to a common target, and/or multiple attempts may be performed on a single target to further ensure that the target was contacted by the agricultural product.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural vehicle, the system comprising:
    a boom assembly;
    a first nozzle assembly positioned along the boom assembly, the first nozzle assembly including a first valve operably coupled with a first nozzle and configured to control a flow of agricultural product through the first nozzle;
    a first imaging device associated with the first nozzle assembly; and
    a computing system operably coupled with the first nozzle assembly and the first imaging device, the computing system configured to:
        receive data related to a first imaged portion of an agricultural field from the first imaging device;
        identify a first target and a position of a first reference point within the first imaged portion of the agricultural field;
        receive data related to a second imaged portion of the agricultural field from the first imaging device, the first imaged portion and the second imaged portion each including the first reference point;
        identify a position of the first reference point within the second imaged portion of the agricultural field;
        determine a speed of movement of the first nozzle based on a distance of movement of the first reference point;
        determine a boom deflection model, wherein the boom deflection model defines a curvature of the boom assembly in a fore direction or an aft direction based on the position of the first imaging device along the boom assembly and the speed of movement of the first nozzle; and
        activate the first valve when the first target is within a first fan of agricultural product exhausted from the first nozzle based on the boom deflection model.

2. The system of claim 1, further comprising:
    a second nozzle assembly positioned along the boom assembly on an opposing side of the first nozzle assembly from a frame of the boom assembly, the second nozzle assembly including a second valve operably coupled with a second nozzle and configured to control a flow of agricultural product through the second nozzle; and
    a second imaging device associated with the second nozzle assembly, wherein the computing system is further operably coupled with the second nozzle assembly and the second imaging device.

3. The system of claim 2, wherein the computing system configured to:
    receive data related to a third imaged portion of the agricultural field from the second imaging device;
    identify a second target and a position of a second reference point within the third imaged portion of the agricultural field;
    receive data related to a fourth imaged portion of the agricultural field from the second imaging device, the third imaged portion and the fourth imaged portion each including the second reference point;
    identify a position of the second reference point within the fourth imaged portion of the agricultural field;
    determine a speed of movement of the second nozzle based on a distance of movement of the second reference point; and
    activate the second valve when the second target is within a second fan of agricultural product exhausted from the second nozzle.

4. The system of claim 1, wherein the first imaging device has a detection zone that at least partially overlaps with the first fan.

5. The system of claim 1, wherein the first reference point is a detected object within the first imaged portion of the agricultural field and the second imaged portion of the agricultural field that is remote from the first target.

6. The system of claim 1, wherein the first reference point is the first target within the first imaged portion of the agricultural field and the second imaged portion of the agricultural field.

7. The system of claim 3, wherein the computing system configured to:
    determine the boom deflection model based on the speed of movement of the first nozzle relative to the speed of movement of the second nozzle.

8. The system of claim 7, wherein the computing system is further configured to:
    activate the first valve when the first target is projected to pass through a first application region a second time due to oscillation of the boom assembly based on the boom deflection model.

9. The system of claim 8, wherein the computing system is further configured to:
    determine an upcoming activation time of the first nozzle or the second nozzle based on the boom deflection model.

10. A method for selectively applying an agricultural product, the method comprising:
    receiving, with a computing system, data related to a first imaged portion of an agricultural field from a first imaging device, the first imaging device associated with a first nozzle assembly including a first valve operably coupled with a first nozzle and configured to control a flow of agricultural product through the first nozzle;
    identifying, with the computing system, a first target and a position of a first reference point within the first imaged portion of the agricultural field;
    receiving, with the computing system, data related to a second imaged portion of the agricultural field from the first imaging device, the first imaged portion and the second imaged portion each including the first reference point;

identifying, with the computing system, a position of the first reference point within the second imaged portion of the agricultural field;

determining, with the computing system, a speed of movement of the first nozzle based on a distance of movement of the first reference point;

receiving, with the computing system, data related to a third imaged portion of the agricultural field from a second imaging device, the second imaging device associated with a second nozzle assembly including a second valve operably coupled with a second nozzle and configured to control a flow of agricultural product through the second nozzle;

identifying, with the computing system, a second target and a position of a second reference point within the third imaged portion of the agricultural field;

receiving, with the computing system, data related to a fourth imaged portion of the agricultural field from the second imaging device, the third imaged portion and the fourth imaged portion each including the second reference point;

identifying, with the computing system, a position of the second reference point within the fourth imaged portion of the agricultural field;

determining, with the computing system, a speed of movement of the second nozzle based on a distance of movement of the second reference point; and determining, with the computing system, a boom deflection model defining a curvature of the boom assembly based on the speed of movement of the first nozzle relative to the speed of movement of the second nozzle.

11. The method of claim 10, further comprising:
activating, with the computing system, the first valve when the first target is within a first fan of agricultural product exhausted from the first nozzle.

12. The method of claim 10, wherein determining the boom deflection model further includes comparing the speed of movement of the first nozzle relative to the speed of movement of the second nozzle and a position of the second imaging device along the boom assembly.

13. The method of claim 10, further comprising:
activating, with the computing system, the second valve when the second target is within a second fan of agricultural product exhausted from the second nozzle.

14. The method of claim 11, wherein the first imaging device comprises an imaging device having a detection zone that at least partially overlaps with the first fan.

15. A system for an agricultural vehicle, the system comprising:
a first nozzle assembly positioned along a boom assembly, the first nozzle assembly including a first valve operably coupled with a first nozzle and configured to control a flow of agricultural product through the first nozzle;
a first imaging device associated with the first nozzle assembly;
a second nozzle assembly positioned along the boom assembly on an opposing side of the first nozzle assembly from a frame of the boom assembly, the second nozzle assembly including a second valve operably coupled with a second nozzle and configured to control a flow of agricultural product through the second nozzle;
a second imaging device associated with the second nozzle assembly; and
a computing system operably coupled with the first nozzle assembly, the first imaging device, the second nozzle assembly, and the second imaging device, the computing system configured to:
receive data from the first imaging device;
identify a first reference point within the data provided by the first imaging device;
receive data from the second imaging device;
identify a second reference point within the data provided by the second imaging device; and
determine a boom deflection model based on a movement of the first reference provided by the first imaging device relative to a movement of the second reference provided by the second imaging device, the boom deflection model determining a curvature of the boom assembly in a fore-aft direction.

16. The system of claim 15, wherein the computing system is further configured to determine a speed of movement of the first nozzle based on a distance of movement of the first reference point between a first imaged portion of an agricultural field and a second imaged portion of the agricultural field.

17. The system of claim 16, wherein the computing system is further configured to determine a direction of movement of the first nozzle based on a direction of movement of the first reference point between a first imaged portion of the agricultural field and a second imaged portion of the agricultural field.

18. The system of claim 15, wherein the computing system is further configured to activate the first valve when a target is within a first fan of agricultural product exhausted from the first nozzle and active the second valve when the target is within a fan of agricultural product exhausted from the second nozzle.

19. The system of claim 18, wherein the computing system is further configured to determine an upcoming activation time based on the boom deflection model, the upcoming activation time defining a time in which a detected target is positioned within the first fan of agricultural product exhausted from the first nozzle.

* * * * *